3,533,808
RELEASE AGENTS FOR CELLULOSE CASINGS
Andrew Hepburn Cameron, Weston, Ontario, Canada, assignor to Union Carbide Canada Limited, Toronto, Ontario, Canada, a company of Canada
No Drawing. Filed Apr. 18, 1968, Ser. No. 724,681
Int. Cl. A22c *13/00*
U.S. Cl. 99—176                                    3 Claims

ABSTRACT OF THE DISCLOSURE

A regenerated cellulose sausage casing is produced which has improved releasability from an uncooked sausage emulsion having coagulated protein on its outer surface by virtue of being heated in the casing. The casing has a release agent selected from sucrose, glucose, lactose and maltose impregnated in at least the inner surface of the casing in an amount of from 15–30% by weight of dry casing.

---

This invention relates to improvements in a regenerated cellulose sausage casing. More particularly it relates to a non-edible sausage casing for use in the preparation of skinless sausage which can be easily removed from a sausage product to give a satisfactory skinless sausage.

In the production of skinless sausage, emulsified meat is stuffed into a tubular regenerated cellulose casing and the stuffed casing is pinched off at intervals into linked sausages. The linked sausages are heated to coagulate the protein in the outer surface layer of the sausage and then cooled to set the coagulated protein. The casing is stripped off leaving a series of firm skinless sausages. An apparatus and method of preparing such skinless sausages is described in my United States application Ser. No. 612,233 filed Jan. 27, 1967 and allowed Oct. 10, 1969 now Pat. No. 3,500,743.

It has been found that when skinless sausages are produced with conventional cellulose casing, the meat sometimes adheres to the casing during the stripping operation and is pulled away with it. Although this adhesion or sticking may be so slight that only slight scuffing of the meat occurs when the casing is stripped, in some cases the sticking may be severe enough to cause some of the sausages to fall apart when the casing is removed. For example, in some meat emulsions having a high fat content as much as 30 percent of the sausages in a production run may be deformed due to adhesion. Furthermore in addition to the deformation of some product, the sticking of the meat to the casing necessitates a slow-down of the stripping operation.

One possible explanation for this sticking is that fats and oils from the meat emulsion rise to the surface of the sausage during the heating stage and these fats and oil enter the pores of the cellulose casing and pull away with the casing during the stripping operation.

It has been found that adhesion of the casing occurs with various types of sauage emulsions including both those containing only meat and animal fat as well as those containing cereal binders. While adhesion was found to occur particularly with emulsions having a high fat content, for example 34 percent or over, the moisture content in the emulsion is also a factor affecting releasability.

By impregnating the casing with a release agent described in this specification so that an effective amount of the release agent is present at the inner surface of the casing, removal of this casing during stripping operations is facilitated and deformation of sausage product due to sticking is substantially eliminated. While in some cases this deformation is so slight that only roughing of the sausage surface occurs, in severe cases the deformation may result in the complete disintegration of some individual sausages.

Certain release agents for cellulose sausage casings are known in the art. These are either particularly adaptable for use with cooked sausage wherein the casing is removed after cooking or else have some detrimental effect on the color, texture or flavor of the sausage product or are comparatively expensive.

It is therefore an object of this invention to provide a regenerated cellulose sausage casing having a novel release agent impregnated therein.

It is another object of this invention to provide a means of improving the releasability of regenerated cellulose sausage casing from a sausage emulsion by impregnating the casing with certain release agents.

It is another object of this invention to provide a method of impregnating the inner surface of a regenerated cellulose sausage casing with a release agent.

According to the present invention a regenerated cellulose sausage casing having improved release characteristics is obtained by impregnating at least the inner surface of the casing with at least one release agent selected from sucrose, glucose, lactose and maltose. For reasons of economy sucrose and glucose are the preferred release agents.

It was also found that a concentration by weight of about 15% or over of release agent gave satisfactory release for a wide selection of sausage emulsion types. A preferred concentration for both beef and pork emulsions is from about 15% to about 30% by weight. These percentage calculations are based on the weight of dry untreated cellulose.

In the preparation of regenerated cellulose sausage casings, glycerine is usually impregnated into the casing as a softening agent in order to resist drying or cracking of the casing during storage prior to stuffing. The impregnation of casing with glycerine is well known in the art. It is usually carried out by passing the casing through a water bath containing glycerine. The bath is warm to facilitate the impregnation of the casing but is usually kept below 60° C. since higher temperature might damage the casing.

It was found that the release agents of this invention can be impregnated into the casing during the glycerine treatment. In this method the release agent is impregnated into the casing through the outer surface. It must be emulsions.

EXAMPLE I

An extruded cellulose casing was passed through a series of acid, salt, water and desulfurizing baths to remove the residue from the production of the cellulose. The casing was then passed through a bath consisting of an aqueous solution of glycerine and sucrose. The bath was maintained at a temperature of approximately 60° C. The casing was passed over a series of rollers in the appreciated that an effective amount of release agent is required only at the inner surface or meat contacting surface of the casing. It was found however that by passing the tubular casing through an aqueous bath of release agent for a sufficient period of time an effective amount of release agent was impregnated through the casing to the inner surface. A casing having a concentration of 15 percent by weight to 30 percent by weight of release agent based on the weight of dry untreated casing was found to give good results for all types of sausage bath to direct the casing over a series of six vertical loops within the bath in order to effectively impregnate the casing with the glycerine and sucrose. When the casing emerged from the bath it was passed through a drier to control the moisture content of the casing to between 7 percent by weight to about 12 percent by weight calculated on the weight of dry untreated cellulose. By adjusting the moisture content to within this range the casing may be more easily reeled and stored prior to finishing.

The casing was found to have approximately 20 percent by weight of sucrose impregnated therein and approximately 18 percent by weight of glycerine. The weight percent of sucrose and glycerine were calculated on the weight of dry untreated cellulose casing. The casing was subsequently shirred and cut into acceptable lengths for use on a stuffing machine. The shirred casing sticks were humidified to obtain a moisture content of approximately 14 percent to about 18 percent by weight. The sticks were then stored at this moisture concentration until used on a stuffing horn. When this casing was stuffed with a pork emulsion having a fat concentration of approximately 35 percent by weight of said emulsion and the stuffed casing steam heated, linked, and the meat surface coagulated as described in my Canadian Pat. 771,842, the casing was easily stripped from the cooled sausages and all sausages had smooth surfaces and a firm texture.

This production run was compared to a run using a similar meat emulsion in a casing having approximately the same moisture and glycerine concentration but without sucrose. With the sucrose free casing the stripping operation had to be slowed down due to frequent sticking and approximately one third of the sausages had some deformation due to adhesion of the meat to the casing.

EXAMPLE II

A casing prepared as described in Example I and impregnated with approximately 20 percent by weight of sucrose based on the weight of dry untreated casing was stuffed with a beef sausage emulsion containing a cereal binder and having an animal fat content of approximately 25 percent by weight of said emulsion. The stuffed casing was steam heated and the meat surface coagulated as described above. The casing was stripped from the cooled sausages and those sausages were compared to similar sausages prepared in a casing without sucrose. The sausages from the sucrose impregnated casing had a firm smooth surface. In the process using a casing without sucrose approximately 25 percent of the sausages deformed due to sticking and many others showed signs of scuffing.

EXAMPLE III

A casing was prepared as described in Example I except that approximately 18 percent by weight of glucose instead of sucrose was impregnated therein. The casing was stuffed with a pork sausage emulsion contaianing a cereal binder and having an animal fat content of approximately 45 percent by weight of the emulsion. The stuffed casing was passed through the apparatus described in Example I and the meat surface was coagulated. When the casing was stripped from the cooled sausages they were compared to a similar sausage prepared from a casing containing approximately the same moisture and glycerine content but without a release agent. The sausages from the casing with the glucose release agent had smooth surfaces and a firm texture. The peeling operation with the glucose impregnated casing was carried out at a speed comparable to the speed of the stuffing operation and the casing peeled readily without interruption. The sausages prepared from the casing without release agent had roughened surfaces and some completely disintegrated.

Production runs with cellulose casing impregnated with a lactose or maltose release agent also exhibit improved release characteristics over similar cellulose casing without a release agent.

I claim:

1. A regenerated cellulose sausage casing having improved releasability from a sausage emulsion, said emulsion having been heated in said casing to coagulate protein on its outer surface only, said casing having a moisture content of from 7 percent by weight to about 18 percent by weight calculated on the dry weight of said casing and including a release agent impregnated in at least its inner surface in an amount of from 15 percent by weight to about 30 percent by weight calculated on the dry weight of said casing, said release agent being at least one selected from the group consisting of sucrose, glucose, lactose and maltose.

2. A casing as claimed in claim 1 wherein glycerine is impregnated in the casing in a concentration of from about 18 percent by weight to about 24 percent by weight calculated on the dry weight of said casing.

3. A casing as claimed in claim 2 wherein said sausage emulsion has an animal fat content of at least 34 percent by weight.

References Cited

UNITED STATES PATENTS

| | | | |
|---|---|---|---|
| 1,070,776 | 8/1913 | Cohoe | 99—176 |
| 1,864,244 | 6/1932 | Henderson | 99—176 |
| 2,709,138 | 5/1955 | Weingand | 99—176 |
| 2,735,354 | 2/1956 | Edgar | 99—187 |
| 2,901,358 | 8/1959 | Underwood | 99—176 |
| 2,999,756 | 9/1961 | Shiner | 99—176 |

FOREIGN PATENTS 1,017,899  10/1957  Germany.

FRANK W. LUTTER, Primary Examiner

R. HALPER, Assistant Examiner

U.S. Cl. X.R.

99—187